United States Patent Office 2,922,243
Patented Jan. 26, 1960

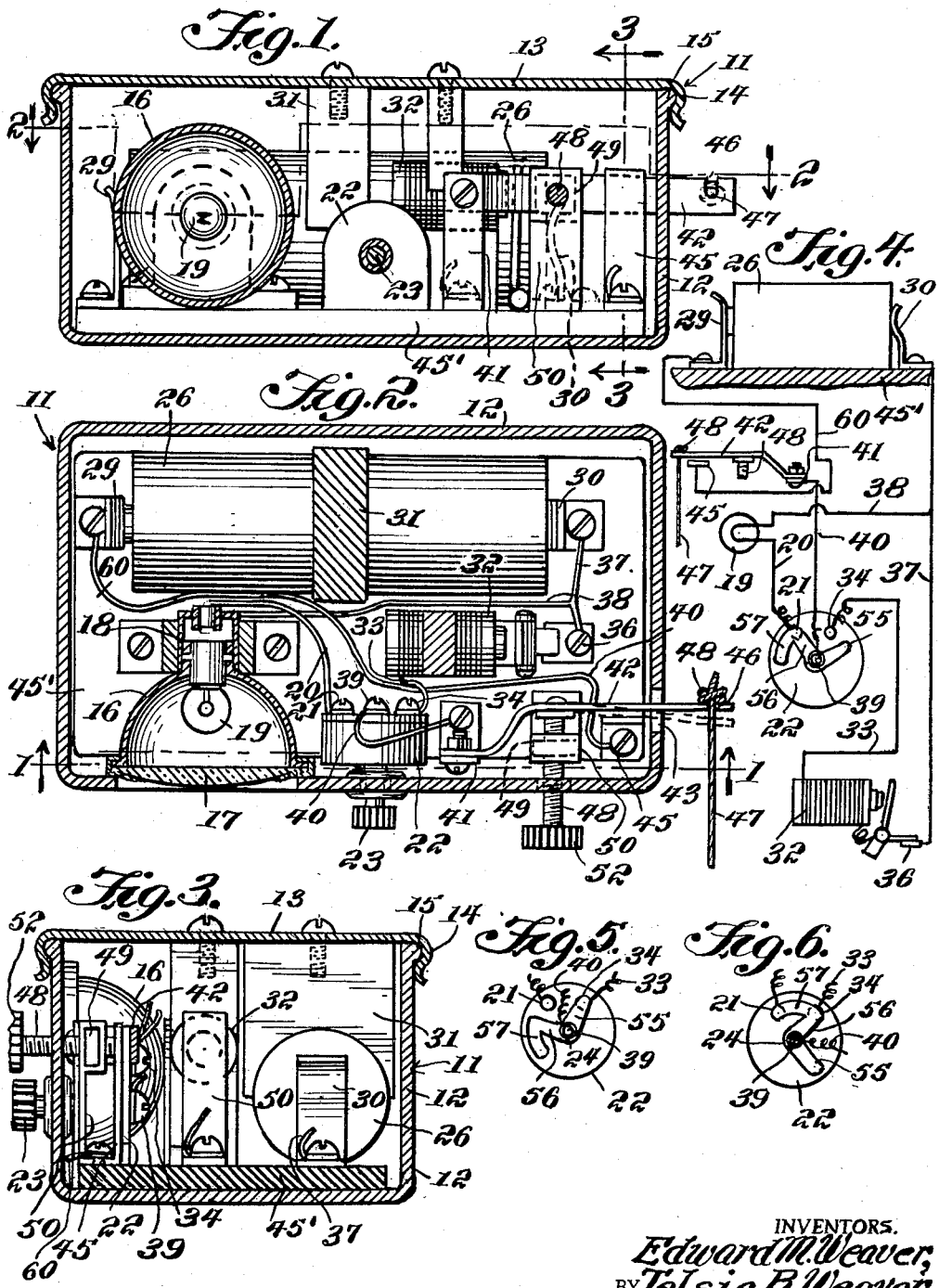

2,922,243
FISHING ALARM DEVICE
Edward M. Weaver and Telsie R. Weaver, Kirkwood, Pa.

Application August 13, 1957, Serial No. 677,920

1 Claim. (Cl. 43—17)

This invention relates to alarm devices, and more particularly to an electrically operated alarm device intended primarily for use with a fishing line to provide either a visual alarm, an audible alarm, or a combination of visual and audible alarms responsive to a tug on the fishing line by a biting fish.

A main object of the invention is to provide a novel and improved fishing line alarm device which is simple in construction, which is very compact in size, and which is easy to set up for use.

A further object of the invention is to provide an improved fishing line alarm device which is inexpensive to manufacture, which is durable in construction, which provides either a visual alarm, an audible alarm, or a combination of both visual and audible alarms responsive to a tug on the fishing line with which it is used, and which is sufficiently compact in size so that it may be readily carried or conveniently stored.

Further objects and advantages of the invention will become apparent from the following description and claim, and from the accompanying drawings, wherein:

Figure 1 is a longitudinal vertical cross sectional view taken through an alarm device according to the present invention, on the line 1–1 of Figure 2.

Figure 2 is a horizontal cross sectional view taken on the line 2–2 of Figure 1.

Figure 3 is a transverse vertical cross sectional view taken on the line 3–3 of Figure 1.

Figure 4 is a schematic wiring diagram showing the electrical connections of the alarm device of Figures 1 to 3.

Figure 5 is a diagrammatic view of the rotary switch device employed in the alarm assembly of Figures 1 to 4, showing the rotary contact of the switch device in position to provide an audible alarm signal.

Figure 6 is a schematic view, similar to Figure 5, but showing the rotary arm of the switch in a position to provide both an audible and visual alarm.

Referring to the drawings, the improved fishing alarm device is designated generally at 11 and comprises a generally rectangular housing 12, preferably of insulating material, provided with a removable top cover 13, the top cover having a depending peripheral flange 14 adapted to engage lockingly over a top bead 15 provided on the rim of the rectangular housing 12. As shown in Figures 1 and 3, the flange 14 is inwardly curved and is adapted to snap over the locking bead 15 to releasably secure the cover 13 in closed position on the housing 12.

Designated at 16 is a flashlight reflector which is mounted in one side wall of the housing 12 and is provided with a transparent lens 17. The reflector 16 contains a conventional flashlight socket 18 in which a conventional flashlight lamp 19 is mounted, the center contact of the socket 18 being connected by a wire 20 to one terminal 21 of a rotary, three-position switch 22 mounted in the side wall of the housing 12 adjacent the lens 17, as is clearly shown in Figure 2. Switch 22 is provided with an external operating knob 23 for rotating the movable switch arm thereof, shown at 24 in Figures 4, 5 and 6.

Designated at 26 is a conventional flashlight battery which may comprise either a single cell, or a pair of cells arranged in series connection, the battery 26 being mounted between a pair of upstanding contact clips 29 and 30, as shown in Figure 2, the center contact of the battery engaging the upstanding clip 29, and the end wall of the casing of the battery engaging the clip 30. Battery 26 is retained in position between the clips 29 and 30 by a depending holding block secured to the cover 13 and formed with an arcuate notch engaging over the battery, to retain the battery in its normal position, shown in Figure 3, when the cover 13 is fitted on the peripheral locking bead 15.

Designated at 32 is a conventional buzzer having a terminal wire 33 connected to a stationary contact terminal 34 of rotary switch 22. The remaining terminal of the buzzer 32, shown at 36, is connected by a wire 37 to the battery terminal clip 30. The shell of lamp socket 18 is connected by a wire 38 to the wire 37, as is clearly shown in Figure 4.

The switch 22 is provided with a terminal 39 connected to the rotary switch arm 24. Switch terminal 39 is connected by a wire 40 to a conductive upstanding bracket member 41 mounted on the bottom wall of housing 12, and conductively secured to said bracket member 41 is an offset outwardly extending flexible contact arm 42 having a straight free end portion of substantial length and flexibility which extends through an aperture in the adjacent end wall of housing 12. An upstanding conductive stationary contact member 45 is secured to the bottom wall of the housing 12 inwardly adjacent the aperture 43 in the end wall of the housing and adjacent the intermediate part of said straight free end portion, as shown in Figure 2. As shown in Figures 2 and 3, the upstanding contact member is in the form of a flat bar facing and extending transverse to the flat free end portion of flexible arm 42.

The elements previously described may be mounted on a suitable base 45', which is in turn fastened to the housing bottom wall, as shown in Figures 1, 2 and 3. Said base 45' is preferably made of suitable rigid insulating material.

As shown in Figure 2, the straight free end portion of the flexible arm 42 extends adjacent the upstanding conductive contact member 45, and may be flexed into engagement therewith, as shown in dotted view in Figure 2.

The outer end of the straight free end portion of the flexible arm 42 is formed with a narrow slot 46, open at its top end, adapted to receive a fishing line 47, the line being provided with a suitable knot 48 in its end, whereby the line is anchored in the slot 46, and whereby a tug on the line will cause the arm 42 to be flexed into conductive engagement with the stationary contact member 45.

Designated at 48 is an adjustable stop screw which is threadedly engaged through a nut 49 mounted in an upstanding supporting bracket 50 secured to the base 45', and located between the bracket member 41 and stationary contact member 45. The screw 48 extends through an aperture in the front wall of housing 12, the screw being provided on its outer end with a suitable knurled head 52, whereby the screw may be manually rotated to adjust the same. The inner end of the screw abuts against the straight free end portion of the arm 42, whereby the amount of tension in the arm 42 may be regulated, whereby to regulate the required amount of force on the fishing line 47 for causing arm 42 to be flexed into contact with the stationary contact member 45.

As shown in Figures 4, 5 and 6, the rotary switch contact arm 24 is provided with a first radial pole element 55 and a second radial pole element 56 provided with an arcuate contact portion 57 concentric with the shaft of the switch. In a first position, shown in Figure 5, the rotary switch member 24 may be set with the pole 55 engaging the stationary contact terminal 34, whereby the device is set for operation of the buzzer 32 responsive to the flexure of the arm 42 into contact with the stationary contact member 45. As shown in Figure 4, battery terminal 29 is connected to the stationary contact element 45 by a wire 60. Thus, when the switch 22 is set with the pole 55 engaged with the stationary contact 34, the engagement of the flexible arm 42 with the stationary contact 45 closes a circuit to energize the buzzer, 33 comprising battery 26, wire 60, contact 45, arm 42, wire 40, switch pole 55, wire 34, the winding of the buzzer, the wire 37, and the battery terminal 30. This provides an audible signal responsive to the tug exerted on line 47 by a biting fish.

Similarly when the switch is set so that the pole element 56 engages the contact 21, the device will provide a visual signal responsive to the engagement of flexible arm 42 with stationary contact 45 to a circuit comprising battery 26, wire 60, contact 45, arm 42, wire 40, switch pole element 56, contact 21, wire 20, the lamp 19, wire 38, wire 37, and the remaining battery terminal 30.

When the rotary arm 24 of the switch is set so that the arcuate pole portion 57 engages both of the contacts 21 and 34, as shown in Figure 6, the closure of the flexible arm 42 with the stationary contact member 45 will simultaneously energize both the flashlight lamp 19 and the buzzer 33. This will be readily apparent from Figure 4, since it will be seen that the wire 40 will be connected through the arcuate switch portion 57 both to wire 20 and wire 34 with the switch set in the position of Figure 6, whereby the flashlight lamp 19 and the buzzer 33 will be energized in parallel between wires 40 and 37 when arm 42 engages the contact 45.

The housing 12 may be fastened in any suitable manner to a stationary object, for example, to a portion of a fishing pier, or to a portion of a boat, and the fishing line 47 may be engaged in the notch 46, as above described. The tension on the flexible switch arm 42 may be adjusted by suitably adjusting the stop screw 48. For night fishing, the switch 22 may be set either to provide operation of the flashlight lamp 19, namely, with the arm portion 56 engaging the stationary contact 21, or to provide simultaneous action of the lamp and buzzer, as illustrated in Figure 6. For daylight fishing, the switch 22 may be merely set to provide the arrangement illustrated in Figure 5, wherein only the buzzer 32 will be energized when the flexible arm 42 engages the stationary contact 45.

While a specific embodiment of an improved fishing alarm device has been disclosed in the foregoing description, it will be understood that various modifications within the spirit of the invention may occur to those skilled in the art. Therefore it is intended that no limitations be placed on the invention except as defined by the scope of the appended claim.

What is claimed is:

A fishing alarm device comprising a housing, a battery mounted in said housing, an upstanding conductive bracket member mounted on the bottom wall of the housing, a flexible contact arm conductively secured to said bracket member, said contact arm being offset adjacent said bracket member, and said contact arm having a straight flat free end portion which extends through a side wall of the housing, said side wall being formed with an aperture receiving said free end portion and being of sufficient size to allow a substantial degree of lateral flexure of said free end portion, the outer end of said free end portion being formed with an open-ended transverse slot arranged to receive and lockingly engage with a fishing line, an upstanding conductive stationary contact member secured to the bottom wall of the housing and positioned between said upstanding conductive bracket member and said aperture, said flat free end portion extending adjacent and transverse to said upstanding conductive stationary contact member, said upstanding contact member being engageable by the intermediate part of said free end portion responsive to flexure thereof by said fishing line, a stop screw threadedly engaged with said housing between the offset in said contact arm and said upstanding conductive stationary contact member and being engageable against said straight free end portion to adjust the preliminary tension on said free end portion needed to engage the said upstanding conductive stationary contact member, an alarm lamp mounted in said housing, a buzzer mounted in said housing, a three-position selector switch mounted in said housing, a pair of energizing conductors, circuit means including said selector switch and being formed and arranged to selectively connect either said lamp, buzzer, or both the lamp and buzzer to the energizing conductor, and means connecting said energizing conductor to said battery through said contact arm and said upstanding stationary contact member.

References Cited in the file of this patent

UNITED STATES PATENTS

| | | |
|---|---|---|
| 522,352 | Poppowitsch | July 3, 1894 |
| 984,534 | Brookins et al. | Feb. 21, 1911 |
| 1,737,921 | Derr | Dec. 3, 1929 |
| 2,446,427 | Linder | Aug. 3, 1948 |
| 2,554,197 | Kronquest | May 22, 1951 |
| 2,556,628 | Nisle | June 12, 1951 |
| 2,755,590 | Collins | July 24, 1956 |
| 2,774,168 | Chute | Dec. 18, 1956 |